(12) United States Patent
Adams, Jr. et al.

(10) Patent No.: US 7,844,127 B2
(45) Date of Patent: *Nov. 30, 2010

(54) EDGE MAPPING USING PANCHROMATIC PIXELS

(75) Inventors: James E. Adams, Jr., Rochester, NY (US); John F. Hamilton, Jr., Rochester, NY (US); Michele O'Brien, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 824 days.

This patent is subject to a terminal disclaimer.

(21) Appl. No.: 11/694,034

(22) Filed: Mar. 30, 2007

(65) Prior Publication Data

US 2008/0240601 A1 Oct. 2, 2008

(51) Int. Cl.
*G06K 9/48* (2006.01)
*G06K 9/40* (2006.01)

(52) U.S. Cl. ..................................... 382/266

(58) Field of Classification Search ............... 382/162, 382/164, 165, 167, 254, 255, 260–264, 266, 382/275, 294, 299; 348/222.1, 230.1, 272, 348/275–277, 627; 358/1.9, 512, 514, 515, 358/518, 525, 530; 375/240.27, 240.29
See application file for complete search history.

(56) References Cited

U.S. PATENT DOCUMENTS

| | | | |
|---|---|---|---|
| 4,618,990 A * | 10/1986 | Sieb et al. ............... | 382/266 |
| 5,420,971 A | 5/1995 | Westerlink et al | |
| 6,529,239 B1 | 3/2003 | Dyck et al. | |
| 6,614,474 B1 | 9/2003 | Malkin et al. | |
| 6,757,012 B1 | 6/2004 | Hubina et al. | |
| 6,801,672 B1 * | 10/2004 | Thomas ................... | 382/275 |
| 7,099,518 B2 * | 8/2006 | Li et al. .................. | 382/255 |
| 7,151,858 B2 * | 12/2006 | Kyong ..................... | 382/266 |
| 7,298,922 B1 * | 11/2007 | Lindgren et al. ........... | 382/294 |
| 7,301,573 B2 * | 11/2007 | Park et al. ................ | 348/252 |
| 7,577,311 B2 * | 8/2009 | Palum et al. .............. | 382/275 |
| 7,688,368 B2 * | 3/2010 | Kijima et al. ............. | 348/272 |
| 2003/0081854 A1 * | 5/2003 | Deshpande ............... | 382/261 |
| 2003/0210332 A1 | 11/2003 | Frame | |
| 2004/0264796 A1 * | 12/2004 | Turner et al. ............. | 382/254 |
| 2007/0024879 A1 * | 2/2007 | Hamilton et al. .......... | 358/1.9 |
| 2007/0024931 A1 * | 2/2007 | Compton et al. ........... | 358/512 |
| 2007/0024934 A1 * | 2/2007 | Andams et al. ............ | 358/525 |
| 2007/0268533 A1 * | 11/2007 | Kijima et al. ............. | 358/512 |
| 2008/0112612 A1 * | 5/2008 | Adams et al. ............. | 382/167 |
| 2008/0123997 A1 * | 5/2008 | Adams et al. ............. | 382/299 |
| 2008/0130073 A1 * | 6/2008 | Compton et al. ........... | 358/512 |
| 2008/0130991 A1 * | 6/2008 | O'Brien et al. ............ | 382/167 |
| 2008/0131028 A1 * | 6/2008 | Pillman et al. ............ | 382/299 |
| 2008/0166062 A1 * | 7/2008 | Adams et al. ............. | 382/255 |
| 2008/0240601 A1 * | 10/2008 | Adams et al. ............. | 382/266 |
| 2008/0240602 A1 * | 10/2008 | Adams et al. ............. | 382/266 |
| 2008/0292182 A1 * | 11/2008 | Morales et al. ............ | 382/162 |
| 2009/0051984 A1 * | 2/2009 | O'Brien et al. ............ | 358/514 |
| 2009/0268055 A1 * | 10/2009 | Hamilton et al. .......... | 348/230.1 |

* cited by examiner

*Primary Examiner*—Amir Alavi
(74) *Attorney, Agent, or Firm*—Raymond L. Owens (57) ABSTRACT

A method of enhancing a full-color image of a scene includes capturing an image of the scene using a two-dimensional sensor array having both color and panchromatic pixels, forming the full-color image in response to the captured color pixels, forming a reference panchromatic image in response to the captured panchromatic pixels, forming an edge map in response to the reference panchromatic image and using the edge map to enhance the full-color image.

6 Claims, 6 Drawing Sheets

| | $E_4$ | |
|---|---|---|
| $E_1$ | $E_3$ | $E_5$ |
| | $E_2$ | |

EDGE MAPPING USING PANCHROMATIC PIXELS

CROSS REFERENCE TO RELATED APPLICATION

The present application is related to U.S. Ser. No. 11/694,071, filed concurrently herewith, of James E. Adams, Jr., et al., entitled "Edge Mapping Incorporating Panchromatic Pixels"; and U.S. patent application Ser. No. 11/564,451, filed Nov. 29, 2007 by James E. Adams, Jr. et al., entitled "Providing A Desired Resolution Color Image".

FIELD OF THE INVENTION

The present invention relates to using an edge map to form an enhanced color image from a panchromatic image and a color image.

BACKGROUND OF THE INVENTION

Video cameras and digital still cameras generally employ a single image sensor with a color filter array to record a scene. This approach begins with a sparsely populated single-channel image in which the color information is encoded by the color filter array pattern. Subsequent interpolation of the neighboring pixel values permits the reconstruction of a complete three-channel, full-color image. This full-color image, in turn, can be noise-cleaned, sharpened, or color corrected to improve, or enhance, the appearance of the image. This image enhancement can be greatly facilitated by computing an edge map of the image in order to classify the image into edge regions and flat regions. This permits the use of algorithms that perform different computations for edge regions and for flat regions. One popular approach is to either directly detect or synthesize a luminance color channel, e.g. "green", and then to generate an edge map from the luminance image. U.S. Pat. No. 6,614,474 (Malkin et al.) describes computing a luminance channel and then generating edge information from a set of directional edge detection kernels. The problem with this approach is that edges that vary only in chrominance and not luminance run the risk of being undetected. To address this concern, U.S. Pat. No. 5,420,971 (Westerink et al.) teaches computing a YUV luminance-chrominance image, computing edge information from all three channels (Y, U, and V), and then combining them as an $L^2$-norm to detect both luminance and chrominance edges. The problem with this approach is that the noisiness of the computed luminance-chrominance image is defined by the noisiness of the original color data, e.g., RGB. This level of noise in the original color data is determined, among other things, by the relative narrowness of the spectral frequency response of the individual color channels. When the scene being captured is well lit, e.g., a sunny landscape, the narrowness of the spectral frequency responses is usually not an issue. When the scene is not well lit, e.g., indoors, or the exposure time is necessarily short to reduce motion blur, e.g., at a sporting event, the relative narrowness of the spectral frequency response of the individual color channels can produce noisy images.

Under low-light imaging situations, it is advantageous to have one or more of the pixels in the color filter array unfiltered, i.e. white or panchromatic in spectral sensitivity. These panchromatic pixels have the highest light sensitivity capability of the capture system. Employing panchromatic pixels represents a tradeoff in the capture system between light sensitivity and color spatial resolution. To this end, many four-color color filter array systems have been described. U.S. Pat. No. 6,529,239 (Dyck et al.) teaches a green-cyan-yellow-white pattern that is arranged as a 2×2 block that is tessellated over the surface of the sensor. U.S. Pat. No. 6,757,012 (Hubina et al.) discloses both a red-green-blue-white pattern and a yellow-cyan-magenta-white pattern. In both cases, the colors are arranged in a 2×2 block that is tessellated over the surface of the imager. The difficulty with such systems is that only one-quarter of the pixels in the color filter array have highest light sensitivity, thus limiting the overall low-light performance of the capture device.

To address the need of having more pixels with highest light sensitivity in the color filter array, U.S. Patent Application Publication No. 2003/0210332 (Frame) describes a pixel array with most of the pixels being unfiltered. Relatively few pixels are devoted to capturing color information from the scene producing a system with low color spatial resolution capability. Additionally, Frame teaches using simple linear interpolation techniques that are not responsive to or protective of high frequency color spatial details in the image.

SUMMARY OF THE INVENTION

It is an object of the present invention to produce an enhanced digital color image from a digital image having panchromatic and color pixels.

This object is achieved by a method of providing an enhanced full-color image of a scene comprising:

(a) using a captured image of the scene that was captured by a two-dimensional sensor array having both color and panchromatic pixels;

(b) forming the full-color image in response to the captured color pixels;

(c) forming a reference panchromatic image in response to the captured panchromatic pixels;

(d) forming an edge map in response to the reference panchromatic image; and (e) using the edge map to enhance the full-color image.

It is a feature of the present invention that images can be captured under low-light conditions with a sensor having panchromatic and color pixels and processing produces an enhanced digital color image produced from the panchromatic and colored pixels.

The present invention makes use of a color filter array with an appropriate composition of panchromatic and color pixels in order to permit the above method to provide both improved low-light sensitivity and improved color spatial resolution fidelity. The above method preserves and enhances panchromatic and color spatial details and produces an enhanced full-color image.

DETAILED DESCRIPTION OF THE INVENTION

In the following description, a preferred embodiment of the present invention will be described in terms that would ordinarily be implemented as a software program. Those skilled in the art will readily recognize that the equivalent of such software can also be constructed in hardware. Because image manipulation algorithms and systems are well known, the present description will be directed in particular to algorithms and systems forming part of, or cooperating more directly with, the system and method in accordance with the present invention. Other aspects of such algorithms and systems, and hardware or software for producing and otherwise processing the image signals involved therewith, not specifically shown or described herein, can be selected from such systems, algorithms, components and elements known in the art. Given the system as described according to the invention in the following materials, software not specifically shown, suggested or described herein that is useful for implementation of the invention is conventional and within the ordinary skill in such arts.

Still further, as used herein, the computer program can be stored in a computer readable storage medium, which can include, for example; magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

Before describing the present invention, it facilitates understanding to note that the present invention is preferably used on any well-known computer system, such as a personal computer. Consequently, the computer system will not be discussed in detail herein. It is also instructive to note that the images are either directly input into the computer system (for example by a digital camera) or digitized before input into the computer system (for example by scanning an original, such as a silver halide film).

Figure 1:
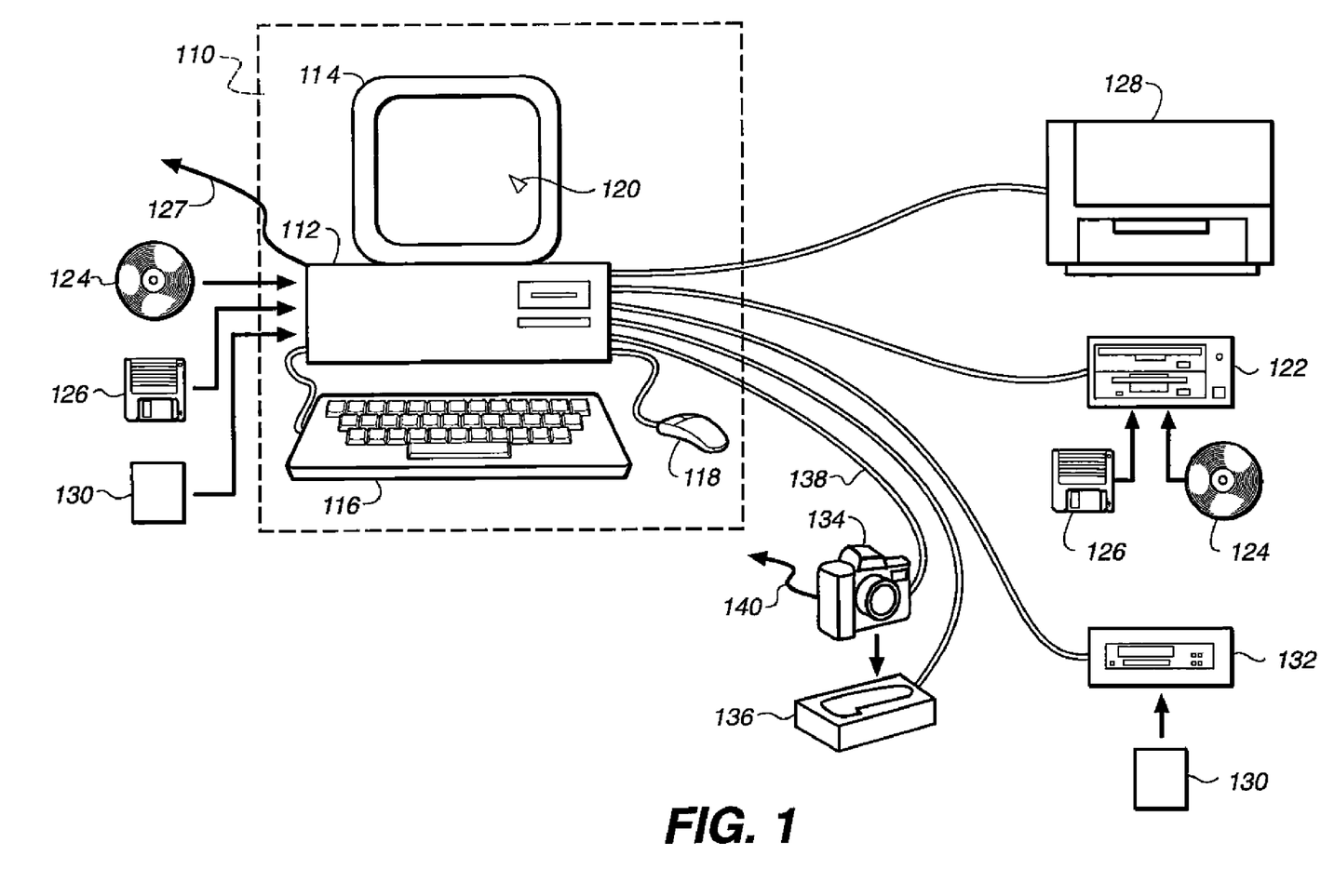
FIG. 1 is a perspective of a computer system including a digital camera for implementing the present invention.

Referring to FIG. 1, there is illustrated a computer system 110 for implementing the present invention. Although the computer system 110 is shown for the purpose of illustrating a preferred embodiment, the present invention is not limited to the computer system 110 as shown, but can be used on any electronic processing system such as home computers, kiosks, retail or wholesale photofinishing, or any other system for the processing of digital images. The computer system 110 includes a microprocessor-based unit 112 for receiving and processing software programs and for performing other processing functions. A display 114 is electrically connected to the microprocessor-based unit 112 for displaying user-related information associated with the software, e.g., by a graphical user interface. A keyboard 116 is also connected to the microprocessor based unit 112 for permitting a user to input information to the software. As an alternative to using the keyboard 116 for input, a mouse 118 can be used for moving a selector 120 on the display 114 and for selecting an item on which the selector 120 overlays, as is well known in the art.

A compact disk-read only memory (CD-ROM) 124, which typically includes software programs, is inserted into the microprocessor based unit for providing a way of inputting the software programs and other information to the microprocessor based unit 112. In addition, a floppy disk 126 can also include a software program, and is inserted into the microprocessor-based unit 112 for inputting the software program. The compact disk-read only memory (CD-ROM) 124 or the floppy disk 126 can alternatively be inserted into externally located disk drive unit 122 which is connected to the microprocessor-based unit 112. Still further, the microprocessor-based unit 112 can be programmed, as is well known in the art, for storing the software program internally. The microprocessor-based unit 112 can also have a network connection 127, such as a telephone line, to an external network, such as a local area network or the Internet. A printer 128 can also be connected to the microprocessor-based unit 112 for printing a hardcopy of the output from the computer system 1110.

Images can also be displayed on the display 114 via a personal computer card (PC card) 130, such as, as it was formerly known, a PCMCIA card (based on the specifications of the Personal Computer Memory Card International Association), which contains digitized images electronically, embodied in the PC card 130. The PC card 130 is ultimately inserted into the microprocessor-based unit 112 for permitting visual display of the image on the display 114. Alternatively, the PC card 130 can be inserted into an externally located PC card reader 132 connected to the microprocessor-based unit 112. Images can also be input via the compact disk 124, the floppy disk 126, or the network connection 127. Any images stored in the PC card 130, the floppy disk 126 or the compact disk 124, or input through the network connection 127, can have been obtained from a variety of sources, such as a digital camera (not shown) or a scanner (not shown). Images can also be input directly from a digital camera 134 via a camera docking port 136 connected to the microprocessor-based unit 112 or directly from the digital camera 134 via a cable connection 138 to the microprocessor-based unit 112 or via a wireless connection 140 to the microprocessor-based unit 112.

In accordance with the invention, the algorithm can be stored in any of the storage devices heretofore mentioned and applied to images in order to sharpen the images.

Figure 2:
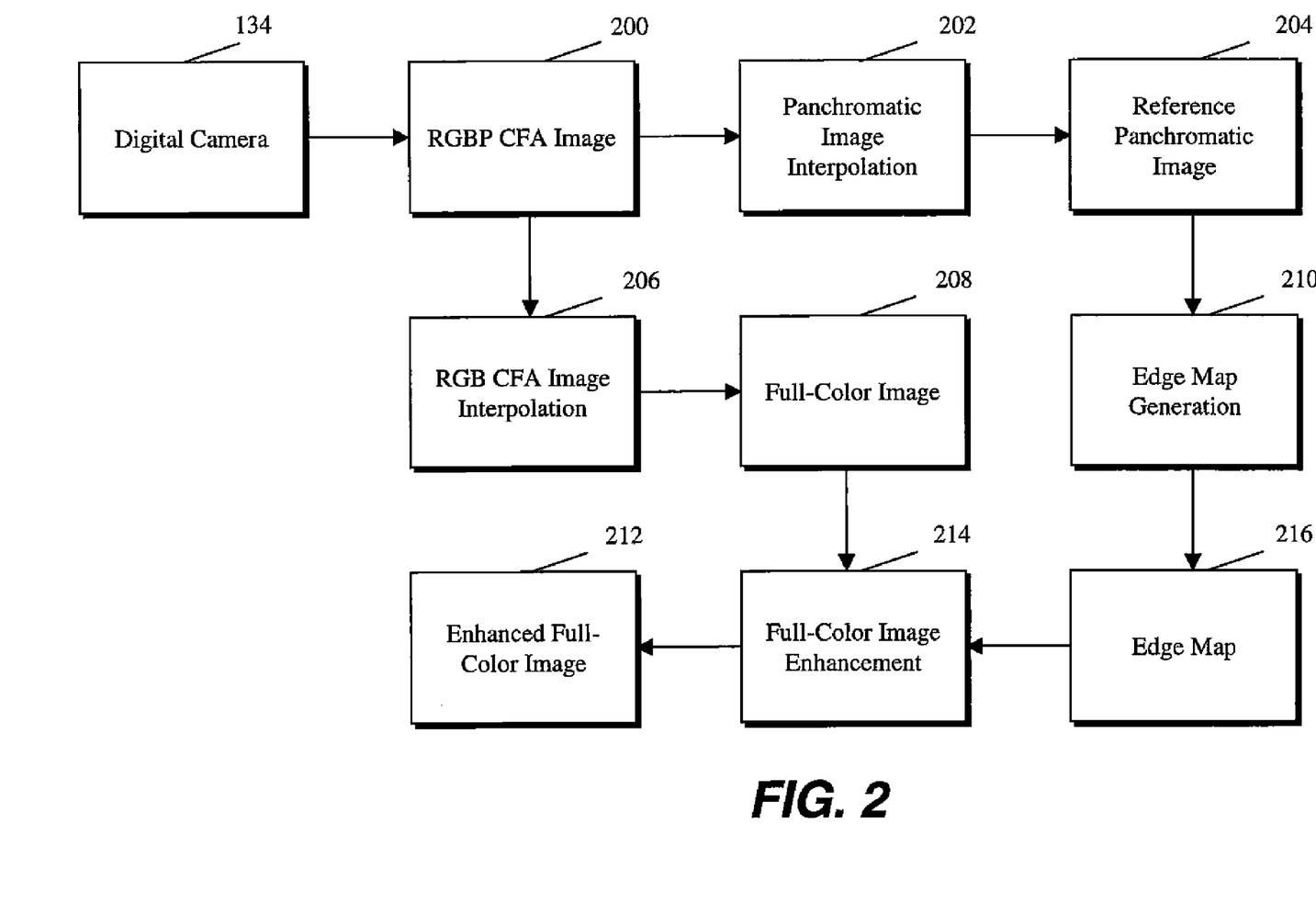
FIG. 2 is a block diagram of a preferred embodiment of the present invention.

FIG. 2 is a high-level diagram of the preferred embodiment of the present invention. The digital camera 134 (FIG. 1) is responsible for creating an original digital red-green-blue-panchromatic (RGBP) color filter array (CFA) image 200, also referred to as the digital RGBP CFA image or the RGBP CFA image. It is noted at this point that other color channel combinations, such as cyan-magenta-yellow-panchromatic, can be used in place of red-green-blue-panchromatic in the following description. The key item is the inclusion of a panchromatic channel. This image is considered to be a sparsely sampled image because each pixel in the image contains only one pixel value of red, green, blue, or panchromatic data. A panchromatic image interpolation block 202 produces a reference panchromatic image 204 from the RGBP CFA image 200. An edge map generation block 210 produces an edge map 216 from the reference panchromatic image 204. From the RGBP CFA image 200, an RGB CFA image interpolation block 206 subsequently produces a full-color image 208. A full-color image enhancement block 214 produces an enhanced full-color image 212 from the full-color image 208 and the edge map 216.

In FIG. 2, the panchromatic image interpolation block 202 and the RGB CFA image interpolation block 206 can be performed in any appropriate ways known to those skilled in the art. Examples can be found in U.S. Patent Publication No. 2007/0024934. Included in this reference, are examples of using just captured panchromatic pixels to produce the reference panchromatic image, using captured panchromatic pixels and captured color pixels to produce the reference image, using just captured color pixels to produce the full-color image and using captured color pixels and captured panchromatic pixels to produce the full-color image.

Figure 3:
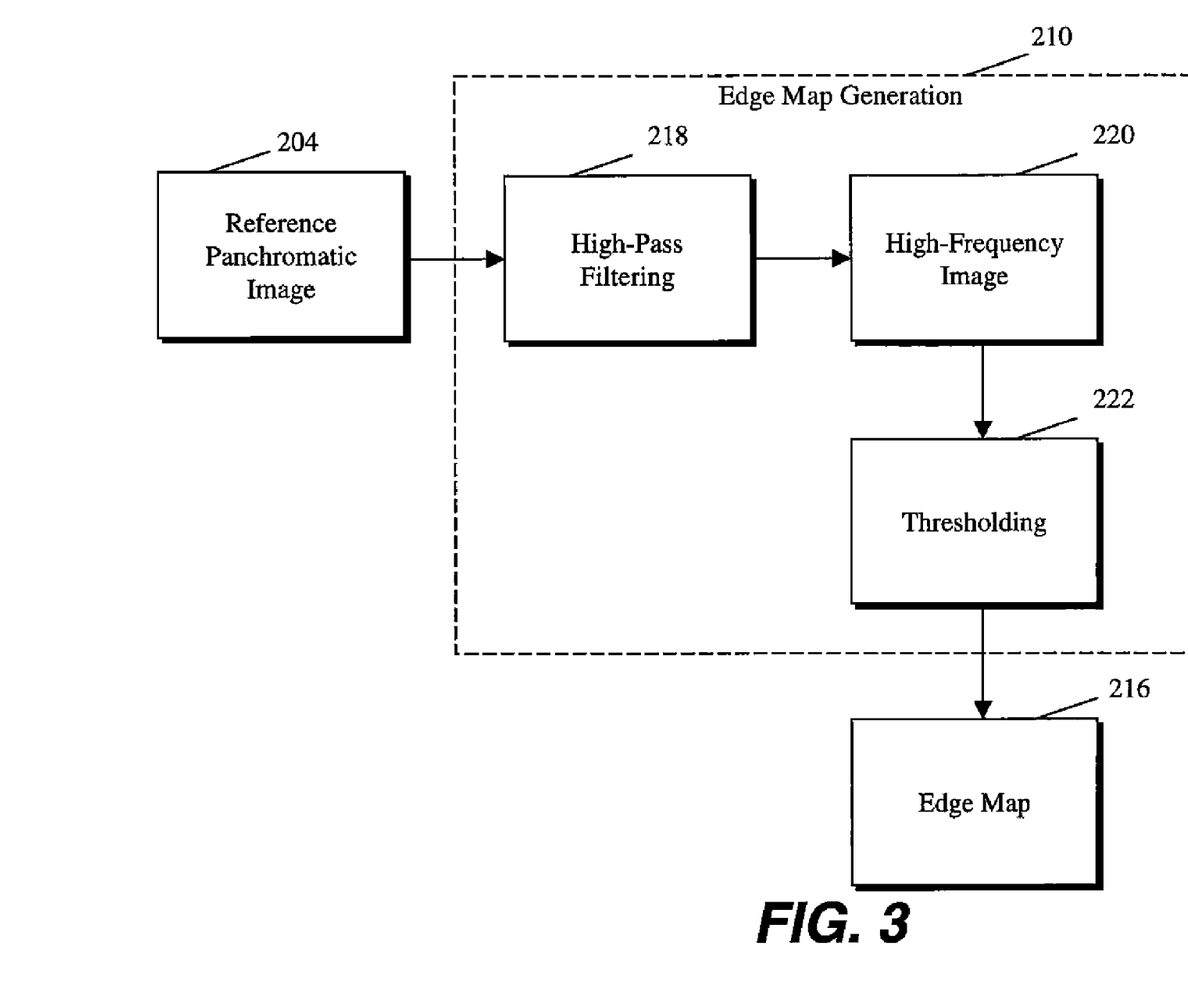
FIG. 3 is a block diagram showing block 210 in FIG. 2 in more detail.

FIG. 3 is a detailed block diagram of the edge map generation block 210 (FIG. 2) for the preferred embodiment. A high-pass filtering block 218 produces a high-frequency image 220 from the reference panchromatic image 204 (FIG. 2). High-pass filtering is generally performed by one of two methods: direct convolution or as a part of unsharp masking. With direct convolution, the reference panchromatic image 204 (FIG. 2) is convolved with a high-pass kernel and the absolute value of the result is the high-frequency image 220. An example of an appropriate high-pass kernel is $$\begin{pmatrix} -1 & -1 & -1 \\ -1 & 8 & -1 \\ -1 & -1 & -1 \end{pmatrix}.$$

It is well known by those skilled in the art, how to create other appropriate high-pass kernels. In the case of unsharp masking, the reference panchromatic image 204 (FIG. 2) is convolved with a low-pass kernel and the resulting low-frequency image is subtracted from the reference panchromatic image 204 (FIG. 2). The absolute value of this subtraction is the high-frequency image 220. An example of an appropriate low-pass kernel would be $$\begin{pmatrix} 1 & 2 & 1 \\ 2 & 4 & 2 \\ 1 & 2 & 1 \end{pmatrix}.$$

It is well known by those skilled in the art how to create other appropriate low-pass kernels. Continuing with description of FIG. 3, a thresholding block 222 produced the edge map 216 (FIG. 2) from the high-frequency image 220. Thresholding in block 222 is generally performed by testing each pixel value in the high-frequency image 220 against a given threshold value. If the pixel value in the high-frequency image 220 is equal to or greater than the given threshold value, the corresponding pixel value in the edge map is marked as an edge pixel and set to a value that indicates the presence of an edge, e.g., one. If the pixel value in the high-frequency image 220 is less than the given threshold value, the corresponding pixel value in the edge map is marked as a flat pixel and set to a value that indicates the absence of an edge, e.g., zero. Multiple thresholds can also be used. For an example, after producing a first edge map using a relatively large first threshold value, a second edge map is produced from the first edge map and the high-frequency image 220 using a smaller second threshold value. In this case, each pixel location in the first edge map marked as an edge pixel, is automatically marked as an edge pixel in the second edge map at the corresponding location. In the case of a pixel location in the first edge map being marked as a flat pixel and at least one of the adjacent pixel locations being marked as an edge pixel, the corresponding high-frequency image 220 pixel value is compared to the second threshold value. If the pixel value in the high-frequency image 220 is equal to or greater than the second threshold value, the corresponding pixel value in the second edge map is marked as an edge pixel. If the pixel value in the high-frequency image 220 is less than the second threshold value, the corresponding pixel value in the second edge map is marked as a flat pixel. It will be clear to one skilled in the art that this process can be continued using additional thresholds.

Figure 4:
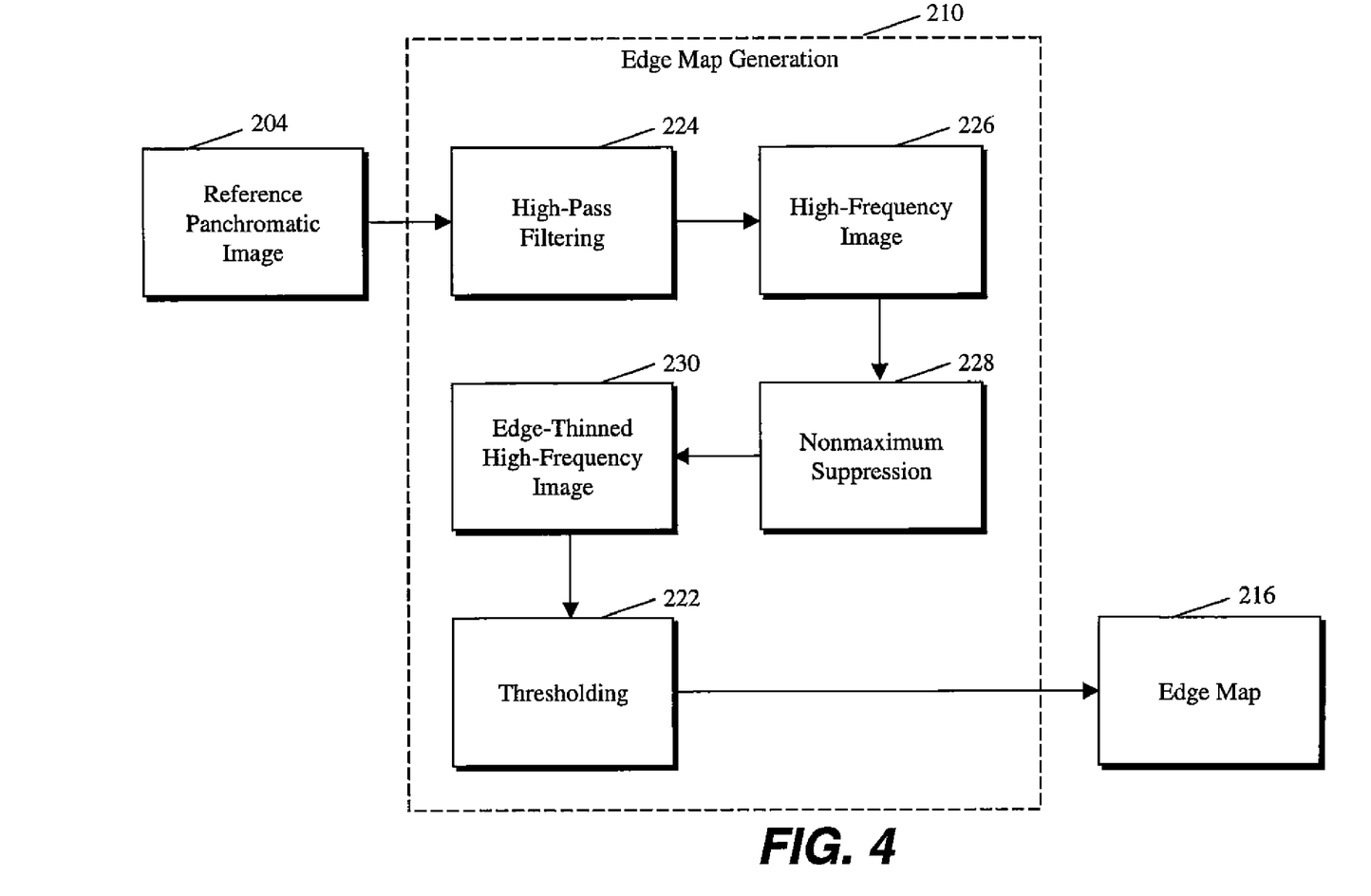
FIG. 4 is a block diagram showing an alternate embodiment of block 210 in FIG. 2 in more detail.

FIG. 4 is a detailed block diagram of the edge map generation block 210 (FIG. 2) for an alternate embodiment. A high-pass filtering block 224 produces a high-frequency image 226 from the reference panchromatic image 204 (FIG. 2). The high-frequency image 226 has three channels. The first channel contains the edge magnitude value which is the result produced by the same computations as performed by high-pass filtering block 218 (FIG. 3). The second channel contains the horizontal gradient value produced by taking the absolute value of a convolution with a horizontal gradient kernel. An example of such a kernel is $$(-1 \; 0 \; 1).$$

The third channel contains the vertical gradient value produced by taking the absolute value of a convolution with a vertical gradient kernel. An example of such a kernel is $$\begin{pmatrix} -1 \\ 0 \\ 1 \end{pmatrix}.$$

Figure 5:
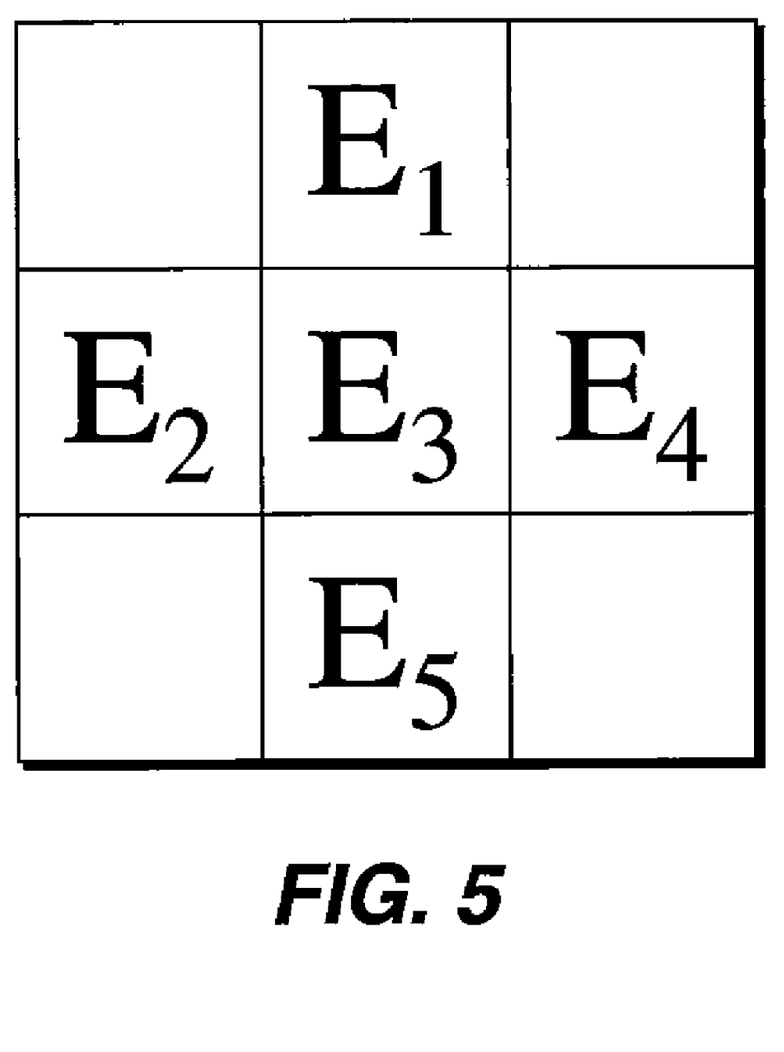
FIG. 5 is a pixel neighborhood used during the execution of the nonmaximum suppression in block 228 in FIG. 4.

Next, the nonmaximum suppression block 228 produces an edge-thinned high-frequency image 230 from the high-frequency image 226. Comparing the horizontal gradient value to the vertical gradient value for each edge magnitude pixel location generally performs nonmaximum suppression in block 228. If the horizontal gradient value is greater than or equal to the vertical gradient value then the direction of nonmaximum suppression is horizontal. If the vertical gradient value is greater than the horizontal value, the direction of the nonmaximum suppression is vertical. FIG. 5 is an example pixel neighborhood of edge magnitude values with the edge magnitude value $E_3$ being operated on. If the direction of nonmaximum suppression is horizontal, then if $E_3$ is greater than or equal to both $E_2$ and $E_4$, it is left unaltered. Otherwise, $E_3$ is set to zero. If the direction of nonmaximum suppression is vertical, then if $E_3$ is greater than or equal to both $E_1$ and $E_5$, it is left unaltered. Otherwise, $E_3$ is set to zero. In FIG. 4, the thresholding block 222 is the same operation as previously described under FIG. 3.

It will be evident to one skilled in the art that the edge map 216 (FIG. 2) can be enhanced in any number of ways, e.g., through the use of morphological processing, to reduce the effects of noise or to change the thickness of the features within the edge map 216 (FIG. 2) in accord with its subsequent use.

Returning to FIG. 2, several examples are now given for the full-color image enhancement block 214. One such full-color image enhancement is noise reduction. For each pixel in the full-color image 208, subsequently referred to as the central pixel, the corresponding value in the edge map 216 is checked to see if it is marked as either an edge pixel or a flat pixel. If the central pixel is an edge pixel, noise reduction of that pixel value can be skipped in order to preserve the edge detail. If the central pixel is a flat pixel, all of the other flat pixels within a given distance of the central pixel are averaged together to produce a noise-reduced central pixel value.

Another example of full-color image enhancement is sharpening (edge enhancement.) A sharpening channel can be produced from the full-color image 208 or from the reference panchromatic image 204 as taught in U.S. patent application Ser. No. 11/621,139, filed Jan. 9, 2007. Next, for each pixel in the full-color image 208, subsequently referred to as the central pixel, the corresponding value in the edge map 216 is checked to see if it is marked as either an edge pixel or a flat pixel. If the central pixel is an edge pixel, the full corresponding sharpening channel value is added to the central pixel value to sharpen the edge detail. If the central pixel is a flat pixel, either a part or none of the corresponding sharpening channel value is added to the central pixel value to reduce the unwanted amplification of noise in the full-color image.

Another example of full-color image enhancement is color correction. Color correction is usually performed by multiplying the color channels value of the full-color image 208 by a 3×3 matrix into order to produce the enhanced full-color image 212. This computation takes the following form:

$$\begin{pmatrix} R' \\ G' \\ B' \end{pmatrix} = \begin{pmatrix} a_{11} & a_{12} & a_{13} \\ a_{21} & a_{22} & a_{23} \\ a_{31} & a_{32} & a_{33} \end{pmatrix} \begin{pmatrix} R \\ G \\ B \end{pmatrix}$$

where (R,G,B) refer to the full-color image 208 color channels values and (R',G',B') refer to the enhanced full-color image 212. For each pixel in the full-color image 208 the corresponding value in the edge map 216 is checked to see if it is marked as either an edge pixel or a flat pixel. If the pixel is an edge pixel, the full corresponding color correction is applied to the full-color image 208 pixel value. If the pixel is a flat pixel, either a partial or no color correction is applied to the full-color image 208 pixel value to reduce the visibility of noise and image processing artifacts.

Figure 6:
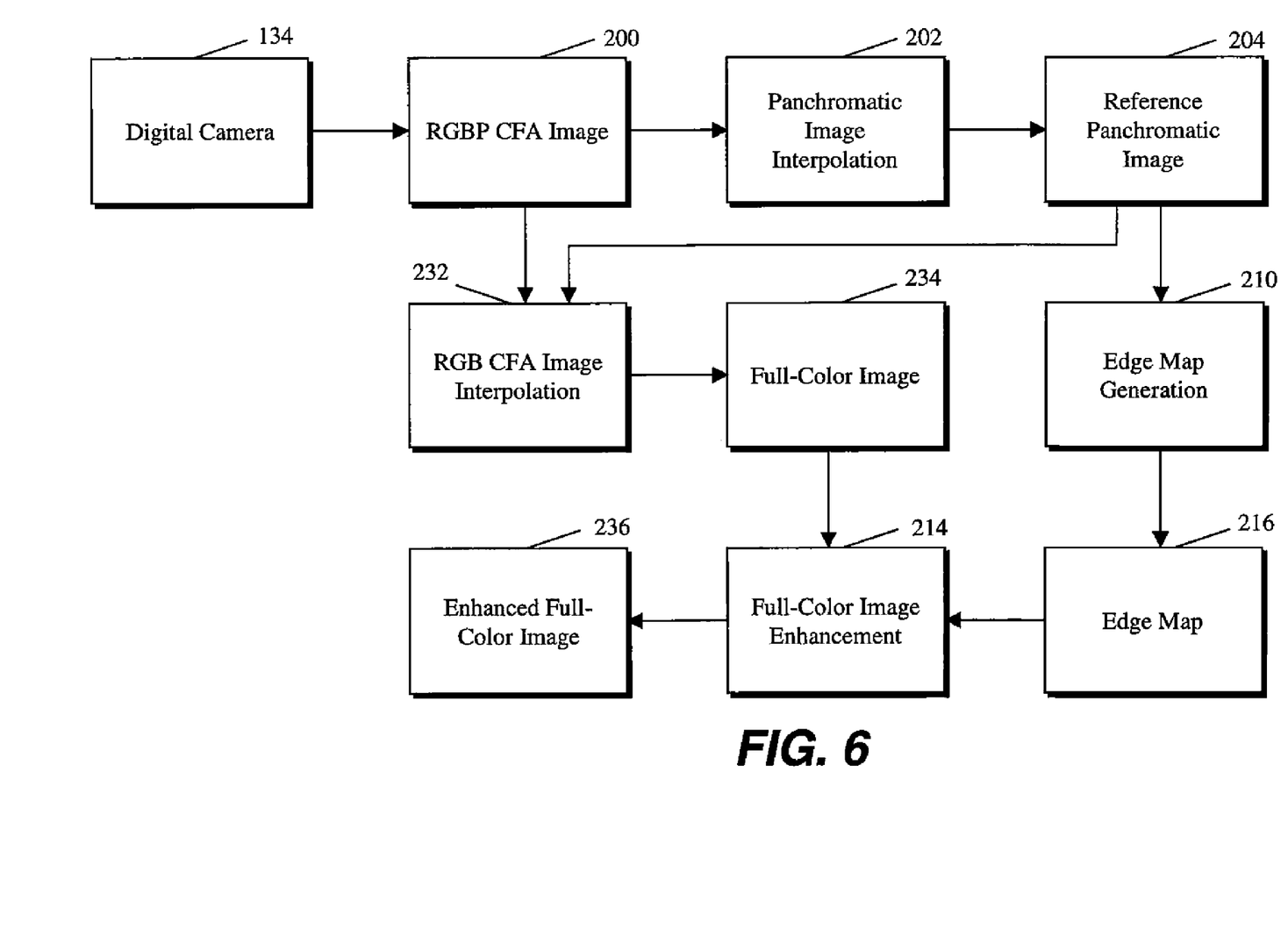
FIG. 6 is a block diagram of an alternate embodiment of the present invention.

FIG. 6 is a high-level diagram an alternate embodiment of the present invention. The digital camera 134, as shown in FIG. 1, is responsible for creating an original digital red-green-blue-panchromatic (RGBP) color filter array (CFA) image 200, also referred to as the digital RGBP CFA image or the RGBP CFA image. It is noted at this point, other color channel combinations, such as cyan-magenta-yellow-panchromatic, can be used in place of red-green-blue-panchromatic in the following description. The key item is the inclusion of a panchromatic channel. This image is considered a sparsely sampled image because each pixel in the image contains only one pixel value of red, green, blue, or panchromatic data. A panchromatic image interpolation block 202 produces a reference panchromatic image 204 from the RGBP CFA image 200. An edge map generation block 210 produces an edge map 216 from the reference panchromatic image 204. From the RGBP CFA image 200 and the reference panchromatic image 204, an RGB CFA image interpolation block 232 subsequently produces a full-color image 234. A full-color image enhancement block 214 produces an enhanced full-color image 236 from the full-color image 234 and the edge map 216.

In FIG. 6, the panchromatic image interpolation block 202 and the RGB CFA image interpolation block 232 can be performed in any appropriate ways known to those skilled in the art. Examples can be found in U.S. Patent Application No. 2007/0024934. Included in this reference, are examples of using just captured panchromatic pixels to produce the reference panchromatic image, using captured panchromatic pixels and captured color pixels to produce the reference image, using just captured color pixels to produce the full-color image and using captured color pixels and captured panchromatic pixels to produce the full-color image. The details of the other blocks in FIG. 6 are the same as in the preferred embodiment, shown in the figures.

The edge map-based algorithms disclosed in the preferred embodiments of the present invention can be employed in a variety of user contexts and environments. Exemplary contexts and environments include, without limitation, wholesale digital photofinishing (which involves exemplary process steps or stages such as film in, digital processing, prints out), retail digital photofinishing (film in, digital processing, prints out), home printing (home scanned film or digital images, digital processing, prints out), desktop software (software that applies algorithms to digital prints to make them better—or even just to change them), digital fulfillment (digital images in—from media or over the web, digital processing, with images out—in digital form on media, digital form over the web, or printed on hard-copy prints), kiosks (digital or scanned input, digital processing, digital or scanned output), mobile devices (e.g., PDA or cell phone that can be used as a processing unit, a display unit, or a unit to give processing instructions), and as a service offered via the World Wide Web.

In each case, the edge map-based algorithms can stand alone or can be a component of a larger system solution. Furthermore, the interfaces with the algorithm, e.g., the scanning or input, the digital processing, the display to a user (if needed), the input of user requests or processing instructions (if needed), the output, can each be on the same or different devices and physical locations, and communication between the devices and locations can be via public or private network connections, or media based communication. Consistent with the foregoing disclosure of the present invention, the algorithms themselves can be fully automatic. However, user input can be used or an operator can review to accept/reject the result. Metadata supplied by a measuring device (e.g. in a camera), can also be used). Moreover, the algorithms can interface with a variety of workflow user interface schemes.

The edge map-based algorithms disclosed herein in accordance with the invention can have interior components that use various data detection and reduction techniques (e.g., face detection, eye detection, skin detection, flash detection).

The invention has been described in detail with particular reference to certain preferred embodiments thereof, but it will be understood that variations and modifications can be effected within the spirit and scope of the invention.

Parts List

110 Computer System
112 Microprocessor-based Unit
114 Display
116 Keyboard
118 Mouse
120 Selector on Display
122 Disk Drive Unit
124 Compact Disk-read Only Memory (CD-ROM)
126 Floppy Disk
127 Network Connection
128 Printer
130 Personal Computer Card (PC card)
132 PC Card Reader
134 Digital Camera
136 Camera Docking Port
138 Cable Connection
140 Wireless Connection
200 RGBP CFA Image
202 Panchromatic Image Interpolation
204 Reference Panchromatic Image
206 RGB CFA Image Interpolation
208 Full-Color Image
210 Edge Map Generation
212 Enhanced Full-Color Image 214 Full-Color Image Enhancement
216 Edge Map
218 High-Pass Filtering
220 High-Frequency Image
222 Thresholding
224 High-Pass Filtering
226 High-Frequency Image
228 Nonmaximum Suppression
230 Edge-Thinned High-Frequency Image
232 RGB CFA Image Interpolation
234 Full-Color Image
236 Enhanced Full-Color Image

The invention claimed is:

1. A method of providing an enhanced full-color image of a scene, comprising using a processor (or computer) to perform the steps of:
   a. using a captured image of the scene that was captured by a two-dimensional sensor array having both color pixels corresponding to at least three color photoresponses and panchromatic pixels;
   b. forming the full-color image in response to the captured color pixels;
   c. forming a reference panchromatic image in response to the captured panchromatic pixels;
   d. forming an edge map in response to the reference panchromatic image; and
   e. using the edge map to enhance the full-color image.

2. The method according to claim 1 wherein element b includes using both the captured color pixels and the captured panchromatic pixels to form the full color image.

3. The method according to claim 2 further using the reference panchromatic image to form the full color image.

4. The method according to claim 1 wherein element c includes using both the captured color pixels and the captured panchromatic pixels to form the reference panchromatic image.

5. The method according to claim 1 wherein the edge map is used to provide noise cleaning.

6. The method according to claim 1 wherein the edge map is used to provide color correction.

* * * * *